United States Patent Office 2,957,760
Patented Oct. 25, 1960

2,957,760

PROCESS FOR THINNING STONE FRUITS WITH ALPHA-(3-CHLOROPHENOXY)-PROPIONIC ACID AND ITS SALTS AND ESTERS

Anthony J. Tafuro, Roslyn, and John Russell Bishop, Hatfield, Pa., assignors to Amchem Products, Inc., Ambler, Pa., a corporation of Delaware No Drawing. Filed Nov. 19, 1957, Ser. No. 697,303

2 Claims. (Cl. 71—2.6)

This invention relates to the art of the chemical thinning of fruits, a method of applying a chemical agent to plants at or after bloom to reduce fruit set. Thinning, as fruit growers know, is necessary not only to obtain fruit of marketable size but also to insure regular annual bearing with those varities which over-crop one year and fail to set the next.

Investigators have proposed several explanations or mechanisms of chemical fruit thinning. Thus, Luckwill, Jour. Hort. Sci., 28: 25–40 (1953), suggests that the spray of naphthaleneacetic acid on apples during bloom prevents fertilization of freshly opened flowers by inducing an incompatible condition between the stylar tissue and the pollen tubes. In post-bloom applications the crop is thinned because of an increased drop in young fruitlets due to seed abortion induced by the treatment.

Hoffman et al. in Proc. Amer. Soc. Hort. Sci., 65:63–70 (1955), suggest that spur vigor is involved in chemical thinning. Developing seeds in fruitlets on weak spurs with a limited food supply may be more susceptible than those with an abundant supply. The elimination of clusters, where two or more fruits have set on the same spur might be explained on the basis of competition for food, that is, the seeds in the fruit having the greatest advantage for food supply may possess the most resistance to the treatment.

Whatever may be the actual mechanisms involved in chemical fruit thinning, it is preferable to hand thinning because it is less tedious and less expensive.

Experience with dinitro orthocresol and the plant growth regulants such as alpha naphthalene acetic acid, naphthylacetamide and N-1-naphthyl phthalamic acid as thinning agents showed that they possess a number of disadvantages. Dinitro orthocresol, one of the earliest agents employed for this purpose, had to be applied to trees within a very narrow limit of concentration and over a very short period of time to avoid overthinning and severe damage to the plants. The toxicity of the compound to humans also created problems in handling the same.

The plant growth regulants mentioned hereinabove, although safe to handle, and operative under very favorable conditions over a longer period of application time, nevertheless must be employed within a relatively narrow limit of concentration or else overthinning, epinasty and other serious damage to foliage and shoots will occur.

The primary object of the present invention is to provide a process of thinning stone fruits, such as peaches, apricots and cherries, wherein the chemical agent may be employed over a relatively wide range of concentrations without danger of overthinning as well as foliage and fruit damage.

A further object of the invention is to provide a process of thinning stone fruits with a chemical agent which can effectively be applied to the trees over a relatively long period of time beginning with full bloom and extending to within 25 to 30 days thereafter.

The agent which we have discovered to possess these desirable properties of thinning stone fruits, particularly peaches, is alpha-(3-chlorophenoxy)-propionic acid and its functional derivatives. The graphic formula of the acid is:

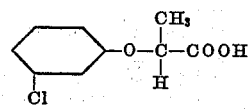

The functional derivatives coming within the purview of the invention are the salts, amines, amides and esters. Among the salts are the alkali metal salts, such as sodium and potassium, and the ammonium salt. Among the amines are monomethyl, diethyl, triethyl, triisopropyl, alkanolamines, etc. Among the esters are methyl, ethyl, propyl, isopropyl, butyl, carbitols, cellosolves, such as ethyl and butyl cellosolve, glycol and polyethylene glycol esters, such as the polyglycol monoether of the formula $R(OC_nH_{2n})_mOH$ where R represents an alkyl radical from 1 to 4 carbon atoms inclusive, $n$ is an integer from 2 to 3 inclusive and $m$ is an integer from 1 to 3 inclusive.

The compounds may be applied to the stone fruit plants any time from full bloom to 30 days thereafter in a number of ways. The water soluble salts, among them the lower amine salts, are preferably sprayed in aqueous solutions. The esters, due to their limited water solubility, are applied as emulsions, the same being formulated, as is well known in the art, with commercially available surface active agents, such as the sulfonated vegetable oils, sodium lauryl sulfate, Tween #20 (polyoxyalkalene derivatives of sorbitan monolaurate), Triton N.E. (a polyalkalene ether alcohol), Carbowax (polyethylene glycols of M.W. 1500 or more), Atlas G–2122 (polyoxyethylene glycol monolaurate), etc. The compounds may also be applied as dusts containing a powdered carrier such as talc, attaclay, etc. Penetrants, sequestrants, mineral oils and cosolvents may also be included in the formulations.

The acid when applied to stone fruit trees in concentrations of 25 p.p.m. to as high as 625 p.p.m. produces fruit thinning with little or no foliage and fruit injury. To obtain the same thinning effect it may be necessary to employ higher concentrations of the amide; however, even at these higher concentrations, the amides are safe.

Illustrative but non-limitative examples of formulations, other than aqueous solutions of the water-soluble compounds are as follows:

EXAMPLE I

| | Parts |
|---|---|
| Methylester of alpha - (3-chlorophenoxy)-propionic acid | 1 |
| 555 oil (aromatic petroleum oil) | 2 |
| Atlas G–1255 emulsifier (polyoxyethylene sorbitol tall oil condensate) | ½ |

EXAMPLE II

| | |
|---|---|
| Ethylester of alpha - (3-chlorophenoxy)-propionic acid | 1 |
| 555 oil | 2 |
| Atlas G–1255 | ½ |

EXAMPLE III

| | |
|---|---|
| Butyl cellosolve ester of alpha-(3-chlorophenoxy)-propionic acid | ½ |
| 555 Oil | 2 |
| Atlas G–1255 | 1 |

The following tables are illustrative of the effect of various concentrations of alpha-(3-chlorophenoxy)-propionic acid on peach trees:

Table I

Halehaven peach trees were sprayed to run off using formulations of alpha-(3-chlorophenoxy)-propionic acid at the concentrations indicated as follows:

| Concentration (p.p.m.) | Fruit Set, Percent | Notes |
|---|---|---|
| 0 | 33 | Control. |
| 5 | 27 | Foliage and fruit normal. |
| 25 | 9 | Do. |
| 125 | 31 | Do. |
| 625 | 3 | Foliage yellowish, but completely recovered in 26 days. |

Although considerable overthinning was experienced with the use of alpha-(3-chlorophenoxy)-propionic acid at the concentration of 625 p.p.m. it was quite apparent from the sprayed trees that neither foliage nor fruit injury resulted from the use of this new thinning agent at this high concentration.

Table II

Application of alpha - (3-chlorophenoxy)-propionic acid at concentrations ranging from 100 to 500 p.p.m. was made on Alberta peach trees with observations recorded as follows:

| Concentration (p.p.m.) | Fruit Set, Percent | Notes |
|---|---|---|
| 0 | 29.3 | Control. |
| 100 | 13 | Foliage and fruit normal. |
| 300 | 7 | Do. |
| 500 | 0.7 | Do. |

The very heavy degree of overthinning experienced at the 500 p.p.m. range of the alpha-(3-chlorophenoxy)-propionic acid resulted in no noticeable injury to either tree foliage or fruit development, thus, demonstrating further the high degree of safety tolerance permissible with the formulations of this invention for spraying stone fruits.

The safety associated with the wide time factor range in applying the formulations of this invention to stone fruit trees is especially valuable to orchard growers because it affords them ample opportunity to evaluate frost damage to blossoms and to determine for a period of 25 to 30 days after the full bloom stage what concentration of alpha-(3-chlorophenoxy)-propionic acid and its functional derivatives would be required to effect the desired thinning results.

We claim:

1. A process of thinning stone fruits by reducing fruit set comprising applying to the stone fruit plants at least at full bloom a compound selected from the class consisting of alpha - (3-chlorophenoxy)-propionic acid, its salts, amines and esters, in a concentration and amount sufficient to thin the fruits.

2. A process of thinning peaches by reducing fruit set comprising applying to the peach trees at least at full bloom alpha-(3-chlorophenoxy)-propionic acid in a concentration and amount sufficient to thin the peaches.

References Cited in the file of this patent
UNITED STATES PATENTS

| | | |
|---|---|---|
| 2,326,471 | Lontz | Aug. 10, 1943 |
| 2,390,941 | Jones | Dec. 11, 1945 |
| 2,744,818 | Davie | May 8, 1956 |
| 2,759,965 | Begin | Aug. 21, 1956 |

OTHER REFERENCES

Crocker: "Growth of Plants," publ. by Reinhold Publ. Corp., N.Y., 1948, page 209.

Synerholm et al. in "Contributions from Boyce Thompson Institute," vol. 14, 1945, pages 91 to 103.

Zimmerman in "Industrial and Engineering Chemistry," May 1943, pages 596 to 601.